United States Patent
Kim et al.

(10) Patent No.: US 8,000,823 B2
(45) Date of Patent: Aug. 16, 2011

(54) AUDIO PLAYBACK TIME ESTIMATING APPARATUS AND METHOD

(75) Inventors: Yong-sung Kim, Suwon-si (KR); Tae-hoon Kim, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 1021 days.

(21) Appl. No.: 11/843,011

(22) Filed: Aug. 22, 2007

(65) Prior Publication Data

US 2008/0172140 A1    Jul. 17, 2008

(30) Foreign Application Priority Data

Jan. 12, 2007  (KR) ........................ 10-2007-0003953

(51) Int. Cl.
  *G06F 17/00*  (2006.01)
  *G06F 7/58*   (2006.01)
  *G06F 1/02*   (2006.01)
  *G06F 7/38*   (2006.01)

(52) U.S. Cl. ........................ 700/94; 708/250; 708/445

(58) Field of Classification Search .................... 700/94; 708/445, 250

See application file for complete search history.

(56) References Cited

U.S. PATENT DOCUMENTS

| 2002/0131761 | A1* | 9/2002 | Kawasaki et al. | 386/65 |
| 2004/0249489 | A1* | 12/2004 | Dick | 700/94 |

FOREIGN PATENT DOCUMENTS

| JP | 2003-297062 | 10/2003 |
| KR | 2002-77959 | 10/2002 |
| KR | 2003-88648 | 11/2003 |
| KR | 2004-44854 | 5/2004 |
| WO | WO 03/023785 | 3/2003 |

OTHER PUBLICATIONS

"treffmeister", "M3: Time display of VBR-files", Jul. 12, 2004, cowonamerica.com, http://www.cowonamerica.com/forums/showthread.php?t=1982, all pages.*
M. Nilsson, "ID3 tag version 2", Mar. 26, 1998, www.id3.org, pp. 1-12.*

* cited by examiner

*Primary Examiner* — Curtis Kuntz
*Assistant Examiner* — Jesse Elbin
(74) *Attorney, Agent, or Firm* — NSIP Law

(57) ABSTRACT

An audio playback time estimating apparatus and method. The apparatus includes a sampling unit to sample a plurality of sample frames of audio data from audio data including an ID3 tag and a plurality of frames using a quasi-random sampling method, an average-bit-rate-calculation unit to calculate an average bit rate of the audio data based on bit rates obtained from the plurality of sample frames, and a playback-time-calculation unit to estimate the playback time of the audio data based on the average bit rate.

27 Claims, 5 Drawing Sheets

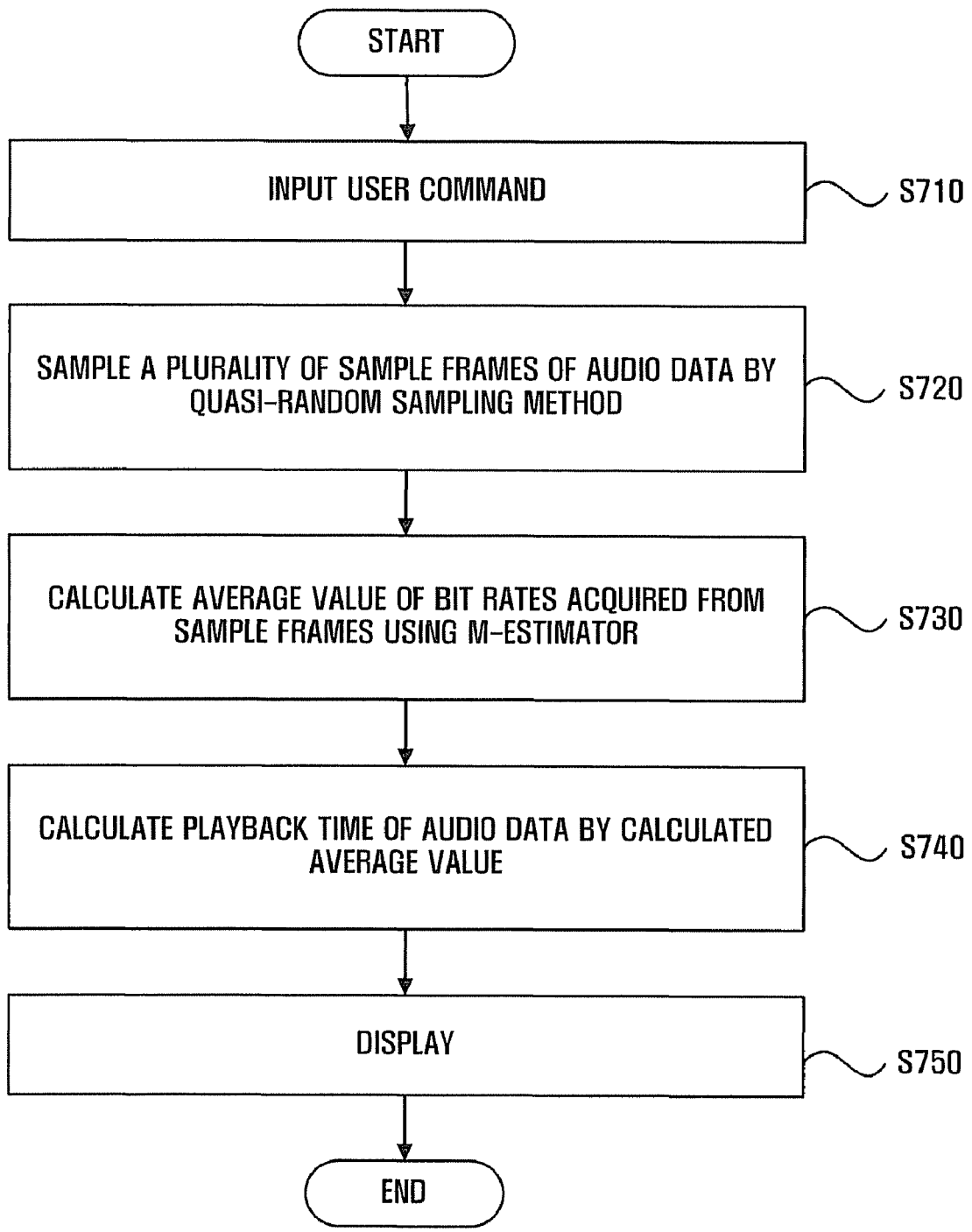

AUDIO PLAYBACK TIME ESTIMATING APPARATUS AND METHOD

CROSS-REFERENCE TO RELATED APPLICATION

This application claims all benefits accruing under 35 U.S.C. §119 from Korean Patent Application No. 10-2007-0003953, filed in the Korean Intellectual Property Office on Jan. 12, 2007, the disclosure of which is incorporated herein by reference.

BACKGROUND OF THE INVENTION

1. Field of the Invention

Aspects of the present invention relate to an apparatus and method to estimate a playback time of audio data and, more particularly, to an audio playback time estimating apparatus and method that can effectively estimate an average bit rate of audio data compressed in a variable bit rate manner.

2. Related Art

Currently, there are a variety of audio compression techniques, including WMA (Windows Media Audio), AAC (Advanced Audio Coding), OGG (Ogg Vorbis), MP3 (MPEG Audio Layer-3), and others. MP3 is a high audio quality audio compression technique specified by the MPEG-1 specification that compresses audio data by frames having independent bit rates. When compressing audio data in MP3 format, the same compression rate, hereinafter referred to as a constant bit rate (CBR), or different compression rates, hereinafter referred to as a variable bit rate (VBR), may be applied to various frames of the audio data. The MP3 audio format is widely used over the Internet because the MP3 audio format compresses audio data 50 times relative to CD audio data, while maintaining CD-quality audio.

A digital audio player, such as an MP3 player, supplies a user with information concerning audio data when playing back the audio data, e.g., an average bit rate, a playback time, and the like. Conventionally, all frames constituting the audio data are scanned to obtain a bit rate of each frame, a play back time, the average bit rate, and the like. However, the scanning time may be undesirably extended if oversized audio data is scanned or a low-performance player is used for scanning.

To solve this problem, a technology has been proposed in which bit rates and playback time are obtained for only K frames occurring at the beginning of the audio data, and average values thereof are estimated as the average bit rate and playback time of the audio data. According to the proposed technology, while estimation of a playback time of audio data compressed at a constant bit rate is relatively accurate, estimation of an accurate playback time of audio data compressed at a variable bit rate cannot be ensured.

SUMMARY OF THE INVENTION

Aspects of the present invention provide an audio playback time estimating apparatus and method that can effectively estimate an average bit rate of audio data compressed at a variable bit rate.

Additional aspects and/or advantages of the invention will be set forth in part in the description which follows and, in part, will be obvious from the description, or may be learned by practice of the invention.

According to an aspect of the present invention, an apparatus to estimate a playback time of audio data is provided. The apparatus includes a sampling unit to sample a plurality of sample frames of audio data from audio data including an ID3 tag and a plurality of frames using a quasi-random sampling method; an average-bit-rate-calculation unit to calculate an average bit rate of the audio data based on bit rates obtained from the plurality of sample frames; and a playback-time-calculation unit to calculate the playback time of the audio data based on the average bit rate.

According to another aspect of the present invention, a method of estimating a playback time of audio data is provided. The method includes sampling a plurality of sample frames of audio data from audio data including an ID3 tag and a plurality of frames using a quasi-random sampling method; calculating an average bit rate of the audio data based on bit rates obtained from the plurality of sample frames; estimating the playback time of the audio data based on the average bit rate; and informing a user of the estimated playback time.

In addition to the example embodiments and aspects as described above, further aspects and embodiments will be apparent by reference to the drawings and by study of the following descriptions.

BRIEF DESCRIPTION OF THE DRAWINGS

A better understanding of the present invention will become apparent from the following detailed description of example embodiments and the claims when read in connection with the accompanying drawings, all forming a part of the disclosure of this invention. While the following written and illustrated disclosure focuses on disclosing example embodiments of the invention, it should be clearly understood that the same is by way of illustration and example only and that the invention is not limited thereto. The spirit and scope of the present invention are limited only by the terms of the appended claims. The following represents brief descriptions of the drawings, wherein:

FIG. 7 is a flowchart showing a method for estimating a playback time of audio data according to an example embodiment of the present invention.

DETAILED DESCRIPTION OF THE EMBODIMENTS

Figure 1:
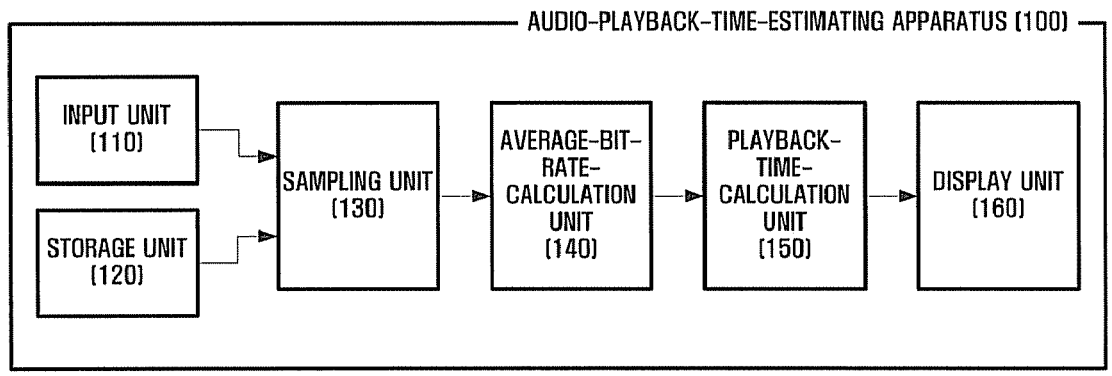
FIG. 1 is a detailed diagram of an apparatus for estimating a playback time of audio data according to an example embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

An apparatus for estimating a playback time of audio data according to an example embodiment of the present invention will now be described with reference to FIGS. 1 through 6. Specifically, FIG. 1 is a detailed diagram of an apparatus 100 for estimating a playback time of audio data according to an embodiment of the present invention. As shown in FIG. 1, the audio playback time estimating apparatus 100 includes a storage unit 120, an input unit 110, a sampling unit 130, an average-bit-rate-calculation unit 140, a playback-time-calculation unit 150, and a display unit 160. According to other aspects of the invention, the audio playback time estimating apparatus 100 may include additional or different units. Similarly, the functionality of one or more units may be combined into a single component. The audio playback time estimating apparatus may include a desktop computer, portable computer, personal entertainment device, home entertainment device, set-top box, personal digital assistant, mobile phone, and the like.

Figure 2:
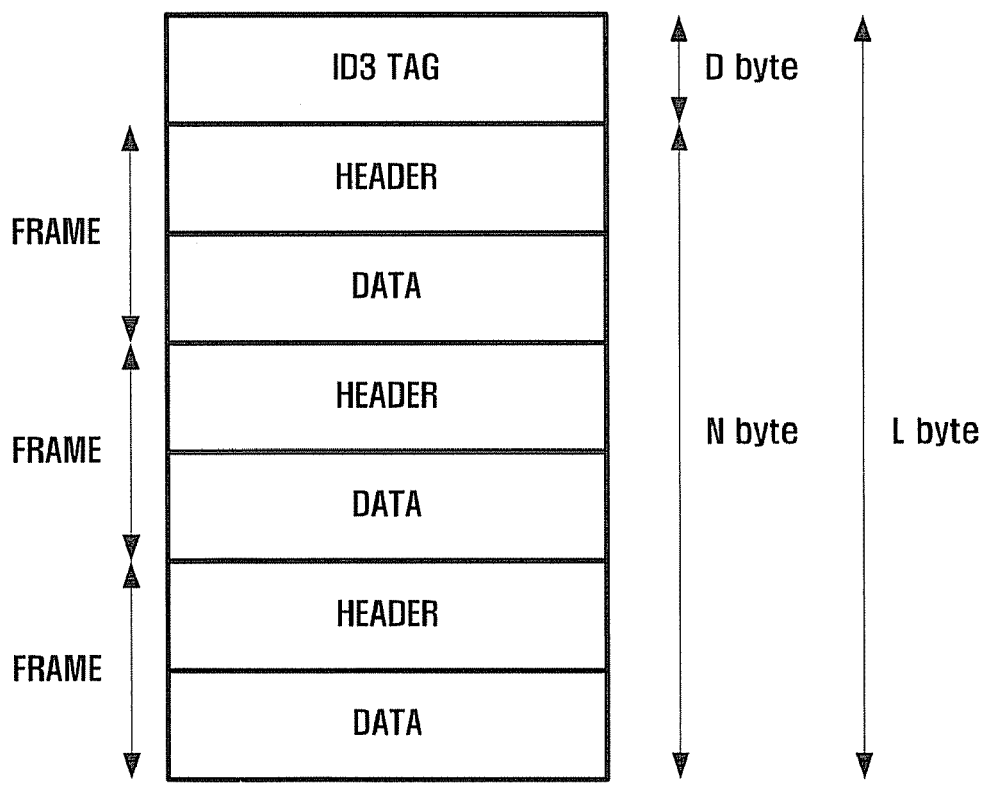
FIG. 2 shows audio data compressed in MP3 format.

The storage unit 120 stores audio data compressed in MP3 format. The audio data has a plurality of frames. A structure of the audio data compressed in MP3 format will briefly be described with respect to FIG. 2. FIG. 2 shows a format of audio data compressed in MP3 format. The audio data has an ID3 tag and a plurality of frames. The ID3 tag includes meta data for the audio data. Each of the plurality of frames includes a header area and a data area. The data area includes audio signals for a predetermined block of the audio data, and the header area includes information on the audio signals recorded on the data area, e.g., a bit rate, a sampling rate, and so on.

Referring to FIG. 1, the storage unit 120 stores not only the audio data compressed in MP3 format but also an algorithm to estimate an average bit rate of the audio data and a playback time of the audio data. The storage unit 120 may be implemented by, but is not limited to, nonvolatile memories, such as a Read Only Memory (ROM), a Programmable Read Only Memory (PROM), an Erasable Programmable Read Only Memory (EPROM), an Electrically Erasable Programmable Read Only Memory (EEPROM), or a Flash memory; volatile memories, such as a Random Access Memory (RAM); and/or storage media, such as a Hard Disk Drive (HDD).

The input unit 110 receives a user command as input. For example, the input unit 110 receives a command to play back pre-stored audio data, a command to interrupt a playback of the audio data, a command to delete pre-stored audio data, or the like. To this end, the input unit 110 may include a plurality of keys for generating corresponding key signals. The plurality of keys may be implemented in hardware or software. The input unit may also be a mouse, touchscreen, clickwheel, microphone, or other device capable of receiving user input.

The sampling unit 130 samples a plurality of frames representing the audio data from pre-stored audio data. In the following description, the frames will be referred to as "sample frames". The sampling unit 130 may sample the plurality of sample frames from the audio data using a quasi-random sampling method. The sample frames sampled by the quasi-random sampling method exhibit random features and uniform features while exhibiting regular features as compared to samples sampled with a random or pseudo-random sampling method.

Figure 3:
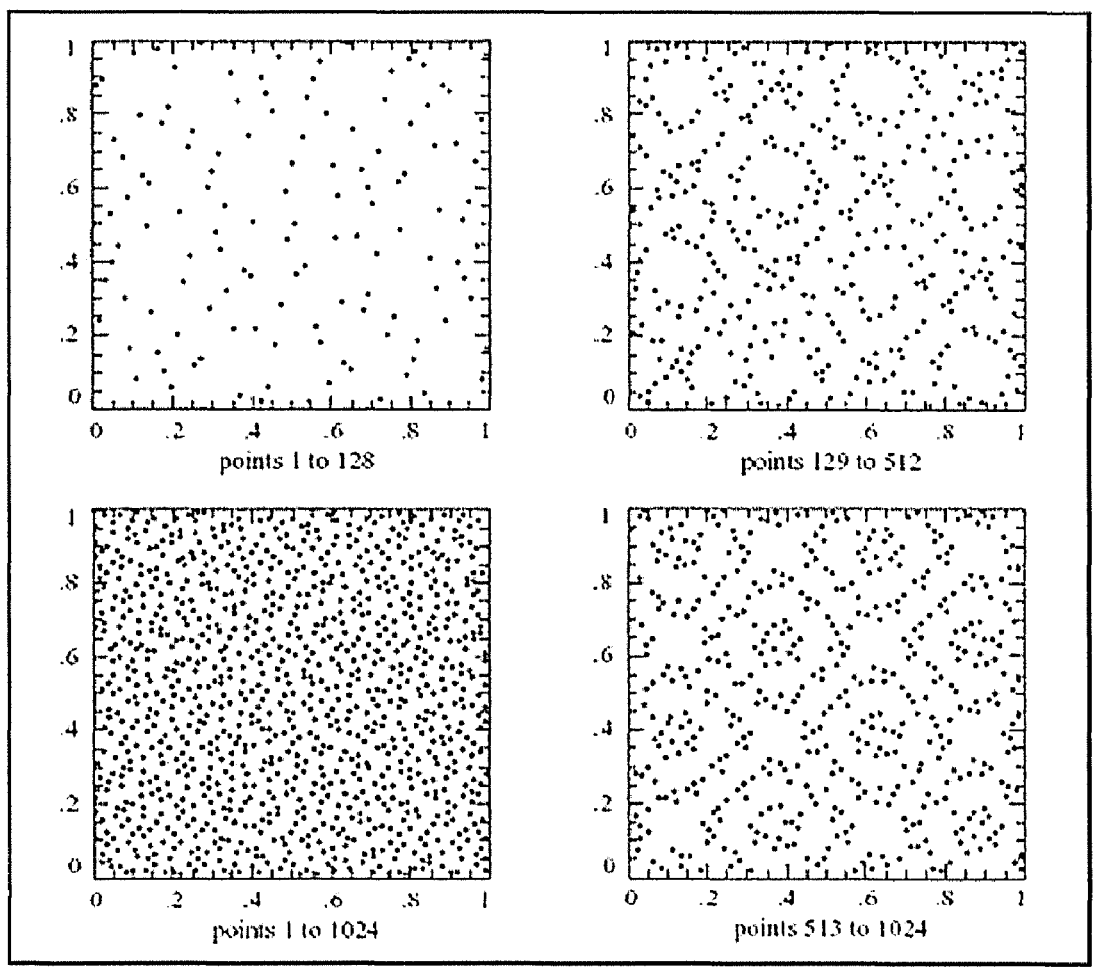
FIG. 3 shows a process of sampling 1024 quasi-random points by a quasi-random sampling method and the results thereof.

FIG. 3 shows a process of sampling 1024 quasi-random points by a quasi-random sampling method and results thereof. The upper left drawing of FIG. 3 shows sampling results of 128 (1 to 128) quasi-random points. The upper right drawing shows sampling results of 384 (129 to 512) quasi-random points. The lower right drawing shows sampling results of 512 (513 to 1024) quasi-random points. The lower left drawing shows sampling results of 1024 (1 to 1024) points.

128 samples, 384 samples, and 512 samples sampled by a quasi-random sampling method occupy a two-dimensional (2D) space in specific patterns. As shown in the lower left drawing of FIG. 3, the 1024 samples are not concentrated in a particular region of the 2D space; rather, the samples are distributed uniformly throughout the 2D space. The quasi-random sampling method allows samples to be more uniformly sampled throughout the populations, in contrast to a random or pseudo-random sampling method, thereby enhancing the sampling accuracy.

Referring to FIG. 1, the sampling unit 130 samples a plurality of sample frames with a quasi-random sampling method. The sampling unit 130 generates K quasi-random numbers. Assuming that the length of audio data, which is obtained by subtracting the length (D) of an ID3 tag from the overall length (L) of all frames of audio data, is N bytes, K may be much smaller than N, that is, K<<N.

The sampling unit 130 arranges the generated K quasi-random numbers in an ascending order. If the result obtained after K quasi-random numbers are arranged as expressed in Equation (1), the condition expressed in Equation (2) is met.

$$\{t_1, t_2, \ldots, t_K\} \tag{1}$$

$$t_i \leq t_j \Leftrightarrow i \leq j \tag{2}$$

where $t_i$ is a quasi-random number and i is an integer between 1 and N.

After the quasi-random numbers are arranged, the sampling unit 130 samples the $t_i^{th}$ frame among the plurality of frames constituting the audio data.

The average-bit-rate-calculation unit 140 calculates the average value by reading a header area of sample frames sampled by the sampling unit 130 to obtain a bit rate of each sample frame. The average-bit-rate-calculation unit 140 preferably calculates the average value using an M-estimator. The average-bit-rate-calculation unit 140 may calculate the average value by applying different weight values according to bit rates obtained from the respective sample frames. The calculated average value may be an estimated value for an average bit rate of the audio data. Examples of the M-estimator include the Cauchy estimator, Welch estimator, Tukey estimator, and the Huber estimator.

Figure 4:
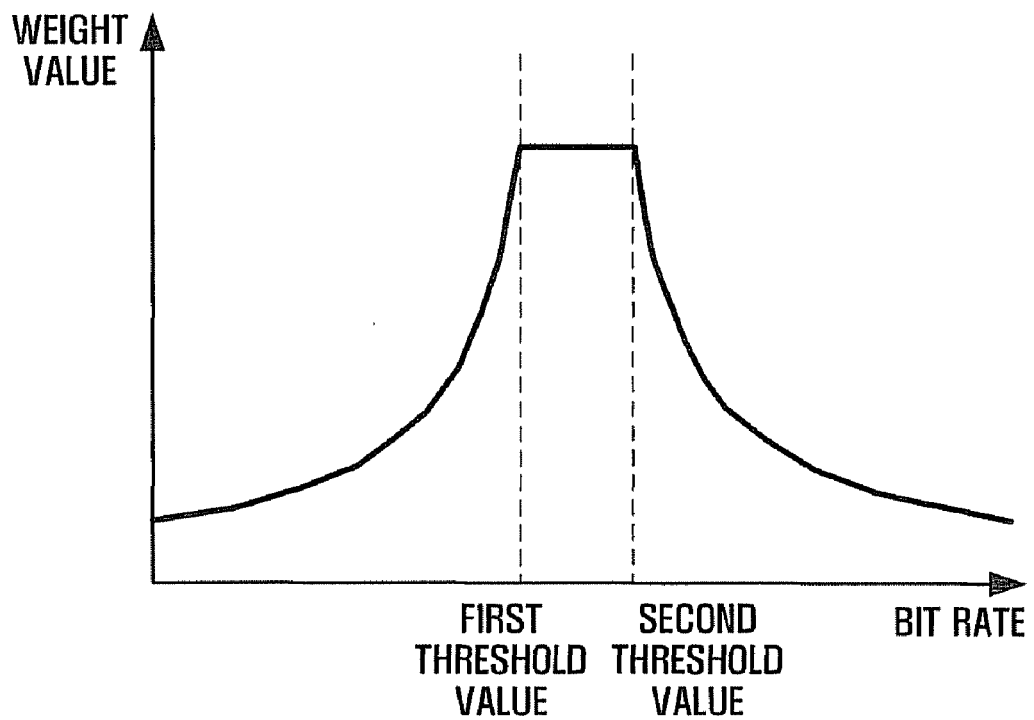
FIG. 4 is a graph illustrating a weight value function used in a Huber estimator according to an example embodiment of the present invention.
Figure 5:
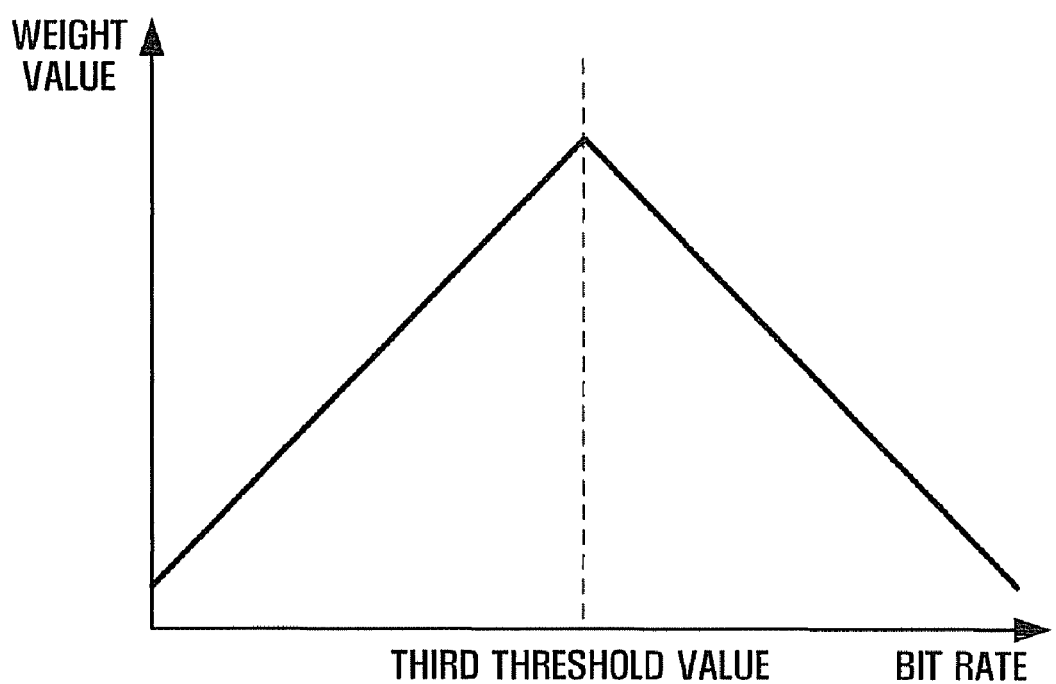
FIG. 5 is a graph illustrating a weight value function used in a Cauchy estimator according to an example embodiment of the present invention.
Figure 6:
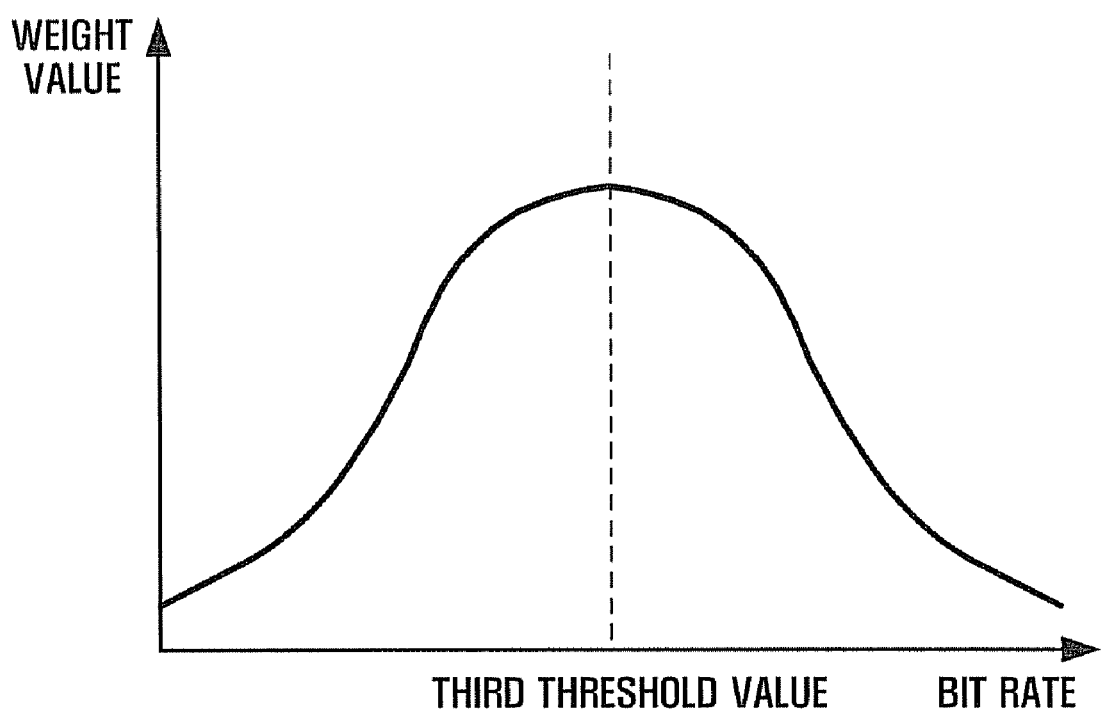
FIG. 6 is a graph illustrating a weight value function used in a Welch estimator according to an example embodiment of the present invention.

FIGS. 4 through 6 illustrate weight value functions applied to an example embodiment of the present invention. FIG. 4 is a graph illustrating a weight value function used in a Huber estimator. FIG. 5 is a graph illustrating a weight value function used in a Cauchy estimator. FIG. 6 is a graph illustrating a weight value function used in a Welch estimator, respectively. In each graph, the x-axis indicates bit rates and the y-axis indicates weight values applied to pertinent bit rates.

Referring to FIG. 4, as the bit rate increases toward a first threshold value, the weight value sharply increases. As the bit rate increases between the first threshold value and a second threshold value, the weight value is maintained at the maximum value. If the bit rate continuously increases after the second threshold value is reached, the weight value sharply decreases. In contrast, in FIG. 5 the bit rate linearly increases toward a third threshold value and linearly decreases from the third threshold value.

Referring to FIG. 6, the bit rate increases toward the third threshold value and decreases from the third threshold value, similar to the weight value function shown in FIG. 5. However, the weight value function shown in FIG. 6 is curved, unlike in that shown in FIG. 5. The third threshold value shown in the graph of FIG. 6 may be the same as or different from that in the graph shown in FIG. 5.

Referring again to FIG. 1, the playback-time-calculation unit 150 calculates the playback time based on the length of all frames constituting the audio data and the average bit rate calculated by the playback-time-calculation unit 150. The playback-time-calculation unit 150 may convert the average bit rate into a byte unit bit rate and divide the average bit rate by the converted value to calculate the playback time of the audio data as represented by expression (3):

$$T = \frac{N}{B \times 8} \quad (3)$$

where T denotes a playback time of audio data, B denotes an average bit rate of audio data calculated by the playback-time-calculation unit 150, and N denotes a length of all frames constituting the audio data, which is obtained by subtracting a length (D) of the ID3 tag from the overall length (L) of the audio data.

The display unit 160 displays a command-processing result in a visible format. For example, the display unit 160 displays a to-be-played list of audio data, a playback time of audio data, or the like. The display unit 160 may be implemented by a variety of display means, such as an LCD, PDP, LED, OLED, or Flexible display. The display unit 160 may be implemented independently of the input unit 110, or may be combined with the input unit 110, like a touch screen.

FIG. 7 is a flowchart showing a process of estimating a playback time of audio data according to an example embodiment of the present invention. Referring to FIG. 7 and FIG. 1, when a user command is received through the input unit 110 at block S710, a plurality of frames representing the audio data is sampled by the sampling unit 130 at block S720. The sampling of the plurality of frames may include generating K quasi-random numbers and sampling the frames of the plurality of frames corresponding to the quasi-random numbers.

Once the sample frames are sampled, the average value is calculated by the average-bit-rate-calculation unit 140 by reading a header area of the sample frames sampled by the sampling unit 130 to obtain a bit rate of each sample frame using an M-estimator at block S730. The calculating of the average value of the bit rates may include applying different weight values according to bit rates by analyzing the bit rates acquired from the plurality of sample frames, and calculating an average value of the bit rates with the weight values applied thereto. Different weight values may be applied to the bit rates acquired from the respective sample frames in order to prevent the average value from being affected by one or two outliers among the bit rates of the respective sample frames. The calculated average value is understood as the average bit rate of the audio data.

The playback-time-calculation unit 150 calculates the playback time based on the length, in units of bytes, of all frames constituting the audio data and the average bit rate calculated by the playback-time-calculation unit 150 at block S740. The calculating of the playback time of the audio data may include the length (N), in units of bytes, of all frames constituting the audio data obtained by subtracting the length (D), in units of bytes, of the ID3 tag from the overall length (L), in units of bytes, of the audio data; converting the average bit rate into a byte unit rate; and dividing N by the converted averted bit rate to obtain the playback time (T) of the audio data. After the calculating of the playback time (T) is completed, the calculated playback time (T) is displayed together with other pieces of information regarding the audio data, e.g., information recorded on the ID3 tag, at block S750.

As described above, the audio data playback time estimation apparatus and method according to aspects of the present invention provide several merits and advantages. An average bit rate and a playback time of audio data can be estimated by scanning only part of the audio data. In sampling sample frames, the sampling accuracy can enhanced and the average bit rate and playback time of the audio data can be facilitated by adopting a quasi-random sampling method. Bit rates and playback times of the respective sampled frames are analyzed and different weight values are applied to the frames for estimation of the average bit rate and playback time, thereby enhancing the estimation accuracy. The average bit rate and playback time of the audio data can be efficiently estimated even in a legacy hardware configuration.

In addition, the present invention can also be embodied as computer readable codes on a computer readable recording medium. The computer readable recording medium is any data storage device that can store data which can be thereafter read by a computer system. Examples of the computer readable recording medium also include read-only memory (ROM), random-access memory (RAM), CD-ROMs, DVDs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

While there have been illustrated and described what are considered to be example embodiments of the present invention, it will be understood by those skilled in the art and as technology develops that various changes and modifications, may be made, and equivalents may be substituted for elements thereof without departing from the true scope of the present invention. Many modifications, permutations, additions and sub-combinations may be made to adapt the teachings of the present invention to a particular situation without departing from the scope thereof. For example, although described with respect to the MP3 audio format, aspects of the invention may be employed with additional audio formats, such as WMA, Ogg Vorbis, AAC, MPEG-4, and/or RealAudio. Similarly, aspects of the invention may be used to estimate the playback time of video data in addition to audio data. Accordingly, it is intended, therefore, that the present invention not be limited to the various example embodiments disclosed, but that the present invention includes all embodiments falling within the scope of the appended claims.

What is claimed is:

1. An apparatus to estimate a playback time of audio data, the apparatus comprising:
    a sampling unit to sample a plurality of sample frames of audio data from audio data including an ID3 tag and a plurality of frames using a quasi-random sampling method in which a plurality of samples are distributed nearly uniformly from the beginning to the end of the plurality of sample frames;
    an average-bit-rate-calculation unit to calculate an average bit rate of the audio data based on bit rates obtained from the plurality of sample frames;
    a playback-time-calculation unit to estimate the playback time of the audio data based on the average bit rate; and
    a storage unit to store the estimated playback time.

2. The apparatus of claim 1, wherein the sampling unit generates a plurality of quasi-random numbers, arranges the plurality of quasi-random numbers in an ascending order, and samples frames of the audio data corresponding to the quasi-random numbers.

3. The apparatus of claim 1, wherein the average-bit-rate-calculation unit applies different weight values to the bit rates acquired from the plurality of sample frames and calculates an average value of the bit rates with the weight values applied thereto.

4. The apparatus of claim 3, wherein the average-bit-rate-calculation unit applies an increasing weight value to the bit rates as the bit rates increase from a minimum value to a first threshold value, applies a weight value to the bit rates corresponding to the first threshold value as the bit rates increase from the first threshold value to a second threshold value, and applies a decreasing weight value to the bit rates as the bit rates increase from the second threshold value to a maximum value.

5. The apparatus of claim 3, wherein the average-bit-rate-calculation unit applies an increasing weight value to the bit rates as the bit rates increases from a minimum value to a threshold value, and applies a decreasing weight value to the bit rates as the bit rates increase from the threshold value to a maximum value.

6. The apparatus of claim 3, wherein the average value is an average bit rate of the audio data.

7. The apparatus of claim 1, wherein the playback-time-calculation unit calculates the playback time by dividing a value obtained by subtracting the length of the 11)3 tag from the overall length of the audio data by a converted value obtained by converting the average bit rate to units of bytes.

8. The apparatus of claim 1, further comprising a display unit to display the playback time of the audio data.

9. A method of estimating a playback time of audio data, the method comprising:
    sampling a plurality of sample frames of audio data from audio data including an ID3 tag and a plurality of frames using a quasi-random sampling method in which a plurality of samples are distributed nearly uniformly from the beginning to the end of the plurality of sample frames;
    calculating an average bit rate of the audio data based on bit rates obtained from the plurality of sample frames;
    estimating the playback time of the audio data based on the average bit rate; and
    informing a user of the estimated playback time.

10. The method of claim 9, wherein the sampling of the plurality of sample frames comprises:
    generating a plurality of quasi-random numbers and arranging the plurality of quasi-random numbers in an ascending order; and
    sampling frames of positions corresponding to the quasi-random numbers.

11. The method of claim 9, wherein the calculating of the average bit rate comprises:
    applying different weight values to the bit rates acquired from the plurality of sample frames; and
    calculating an average value of the bit rates with the weight values applied thereto.

12. The method of claim 11, wherein the applying of different weight values to the bit rate comprises:
    applying an increasing weight value to the bit rates as the bit rates increase from a minimum value to a first threshold value;
    applying a weight value to the bit rates corresponding to the first threshold value as the bit rates increase from the first threshold value to a second threshold value; and
    applying a decreasing weight value to the bit rates as the bit rates increase from the second threshold value to a maximum value.

13. The method of claim 11, wherein the applying of different weight values to the bit rates comprises:
    applying an increasing weight value to the bit rates as the bit rates increase from a minimum value to a threshold value; and
    applying a decreasing weight value to the bit rates as the bit rates increase from the threshold value to a maximum value.

14. The method of claim 11, wherein the average value is an average bit rate of the audio data.

15. The method of claim 11, wherein the estimating of the playback time comprises calculating the playback time by dividing a value obtained by subtracting the length of the ID3 tag from the overall length of the audio data by a converted value obtained by converting the average bit rate to units of bytes.

16. The method of claim 9, wherein the informing of the user comprises displaying the playback time of the audio data.

17. A non-transitory computer readable medium comprising instructions that, when executed by a computer, cause the computer to perform a method comprising:
    randomly sampling a plurality of frames of audio data such that a plurality of samples are distributed nearly uniformly from the beginning to the end of the plurality of sample frames;
    calculating an average bit rate of the audio data based on bit rates of the sampled plurality of frames;
    estimating the playback time of the audio data based on the average bit rate; and
    informing a user of the estimated playback time.

18. The computer readable medium of claim 17, further comprising the audio data.

19. The computer readable medium of claim 17, wherein the informing of the user comprises displaying the estimated playback time on a display.

20. An apparatus to accurately estimate a playback time of audio data, the apparatus comprising:
    a sampling unit to randomly sample a plurality of frames of audio data such that a plurality of samples are distributed nearly uniformly from the beginning to the end of the plurality of sample frames;
    a calculator unit to calculate an average bit rate of the sampled plurality of frames and to estimate a playback time of the audio data using the average bit rate; and
    a storage unit to store the estimated playback time.

21. The apparatus of claim 20, wherein the storage unit stores the audio data and the estimated playback time.

22. The apparatus of claim 20, wherein the calculator unit comprises:
    an average bit rate calculator to calculate the average bit rate of the sampled plurality of frames; and
    a playback time calculator to estimate the playback time of the audio data using the average bit rate.

23. The apparatus of claim 22, wherein the average bit rate calculator reads a header of each of the sampled plurality of frames to determine the bit rate of each of the sampled plurality of frames.

24. The apparatus of claim 22, wherein the average bit rate calculator calculates the average value using an M-estimator.

25. The apparatus of claim 20, wherein the audio data is in one of an MP3 format, a WMA (Windows Media Audio) format, or an Ogg format.

26. The apparatus of claim 20, wherein the audio data has an ID3 tag.

27. The apparatus of claim 20, wherein the sampling unit generates a plurality of quasi-random numbers in an ascending order and samples frames of the audio data corresponding to the random numbers.

* * * * *